(12) United States Patent
Yamaoka et al.

(10) Patent No.: US 10,737,384 B2
(45) Date of Patent: Aug. 11, 2020

(54) ROBOT SYSTEM

(71) Applicant: FANUC CORPORATION, Minamitsuru-gun, Yamanashi (JP)

(72) Inventors: Nobuaki Yamaoka, Yamanashi (JP); Hajime Suzuki, Yamanashi (JP); Kaimeng Wang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 115 days.

(21) Appl. No.: 16/102,058

(22) Filed: Aug. 13, 2018

(65) Prior Publication Data
US 2019/0061150 A1 Feb. 28, 2019

(30) Foreign Application Priority Data

Aug. 22, 2017 (JP) .................................. 2017-159229

(51) Int. Cl.
*B25J 9/16* (2006.01)
*H04N 5/225* (2006.01)
*B25J 19/02* (2006.01)

(52) U.S. Cl.
CPC ............. *B25J 9/163* (2013.01); *B25J 9/1697* (2013.01); *B25J 19/023* (2013.01);
(Continued)

(58) Field of Classification Search
CPC combination set(s) only.
See application file for complete search history.

(56) References Cited

U.S. PATENT DOCUMENTS 9,182,229 B2 * 11/2015 Grasser .................. G01C 15/00
9,879,993 B2 * 1/2018 McFadden ............. G01C 15/00
(Continued)

FOREIGN PATENT DOCUMENTS

CN 101623867 1/2010
CN 102189550 9/2011
(Continued)

OTHER PUBLICATIONS

Notification of Reasons for Refusal dated Jul. 2, 2019 in Japanese Patent Application No. 2017-159229.
(Continued)

*Primary Examiner* — Bhavesh V Amin
(74) *Attorney, Agent, or Firm* — Wenderoth, Lind & Ponack, L.L.P.

(57) ABSTRACT

A robot system includes a light source, an image capture device, a robot mechanism unit having a target site of position control where the light source is provided, and a robot controller that controls the position of the robot mechanism unit based on a position command, a position feedback, and a position compensation value. The robot controller includes a path acquisition unit that makes the image capture device capture an image of light from the light source continuously during the predetermined operation to acquire a path of the light source from the image capture device, a positional error estimation unit that estimates positional error of the path of the light source from the position command based on the acquired path of the light source and the position command, and a compensation value generation unit that generates the position compensation value based on the estimated positional error.

7 Claims, 6 Drawing Sheets

(52) U.S. Cl.
CPC ......... *H04N 5/2254* (2013.01); *H04N 5/2256* (2013.01); *H04N 5/2257* (2013.01); *G05B 2219/40613* (2013.01)

(56) References Cited

U.S. PATENT DOCUMENTS

| | | | | |
|---|---|---|---|---|
| 2016/0357187 A1* | 12/2016 | Ansari | .................... | G01S 13/89 |
| 2016/0357188 A1* | 12/2016 | Ansari | ................. | G05D 1/0212 |
| 2016/0357262 A1* | 12/2016 | Ansari | .................... | G06F 3/017 |
| 2016/0358477 A1* | 12/2016 | Ansari | ................... | G08G 1/167 |
| 2019/0061150 A1* | 2/2019 | Yamaoka | ............. | H04N 5/2256 |

FOREIGN PATENT DOCUMENTS

| | | |
|---|---|---|
| CN | 104735445 | 6/2015 |
| CN | 105486288 | 4/2016 |
| CN | 105759720 | 7/2016 |
| CN | 106112152 | 11/2016 |
| JP | 2011-167817 | 9/2011 |
| JP | 2012-240142 | 12/2012 |
| JP | 2017-124468 | 7/2017 |

OTHER PUBLICATIONS

Office Action dated Feb. 3, 2020 in Chinese Patent Application No. 201810935432.X.

* cited by examiner

ROBOT SYSTEM

This application is based on and claims the benefit of priority from Japanese Patent Application. No. 2017-159229, filed on 22 Aug. 2017, the content of which is incorporated herein by reference.

BACKGROUND OF THE INVENTION

Field of the invention

The present invention relates to a robot system for compensation for control over the position of a robot mechanism unit.

Related Art

An arm tip position (target site of position control) of a robot mechanism unit is controlled by an industrial robot system for laser cutting, sealing, arc welding, etc., for example. In such a robot system, the arm tip position of the robot mechanism unit may shift from an intended position or vibrate for a reason of an accuracy reducing factor of a reducer or insufficient rigidity of an arm of the robot mechanism unit or backlash, etc. This may reduce the quality of a machining target.

Patent documents 1 and 2 describe robot systems to solve these problems. In these robot systems, a sensor is provided at an arm tip position of a robot mechanism unit. The sensor measures positional error of the arm tip position of the robot mechanism unit from a position command during operation of the robot mechanism unit based on an operation program or measures vibration of the arm tip position of the robot mechanism unit. The robot system exerts learning control repeatedly to calculate a learned compensation value for reducing the measured positional error or vibration. Examples of the sensor include a vision sensor, an acceleration sensor, a gyroscope sensor, an inertial sensor, and a strain gauge.

Patent Document. 1: Japanese Unexamined Patent Application, Publication No. 2011-167817

Patent Document 2: Japanese Unexamined Patent Application, Publication No. 2012-240142

SUMMARY OF THE INVENTION

An acceleration sensor, a gyroscope sensor, an inertial sensor, and a strain gauge are used for acquiring physical quantities such as an acceleration, an angular velocity, force, etc. These quantities should be converted by process such as integration to determine a position. Hence, the accuracy of the position resulting from the conversion may be low. Low accuracy of position calculation reduces effect of improving positional accuracy to be achieved by learning control. In some cases, learning control may cause adverse effect.

By contrast, using an image capture device such as a vision sensor allows direct acquisition of position data. Meanwhile, acquiring position data through image processing, etc. takes time. This makes it difficult for a common image capture device to acquire position data in a cycle comparable to a cycle of controlling a robot mechanism unit. Hence, the common image capture device has difficulty in realizing learning control.

The present invention is intended to provide a robot system that generates a position compensation value for compensation for control over the position of a robot mechanism unit using an image capture device.

(1) A robot system according to the present invention (robot system 1 described later, for example) comprises: a light source (light source 20 described later, for example); an image capture device (camera 30 described later, for example) that captures an image of light from the light source; a robot mechanism unit (robot mechanism unit 10 described later, for example) having a target site of position control where the light source or the image capture device is provided; and a robot controller (robot controller 40 described later, for example) that controls the position of the robot mechanism unit based on a position command for the robot mechanism unit for making the robot mechanism unit perform predetermined operation, a position feedback from the robot mechanism unit, and a position compensation value for control over the position of the robot mechanism unit. The robot controller comprises: a path acquisition unit (path acquisition unit 42 described later, for example) that makes the image capture device capture an image of light from the light source continuously during the predetermined operation to acquire a path of the light source from the image capture device; a positional error estimation unit (positional error estimation unit 43 described later, for example) that estimates positional error of the path of the light source from the position command or the position feedback based on the path of the light source acquired by the path acquisition unit and the position command or the position feedback; and a compensation value generation unit (compensation value generation unit 44 described later, for example) that generates the position compensation value based on the positional error estimated by the positional error estimation unit.

(2) In the robot system described in (1), during execution of learning control of repeating the predetermined operation, the robot controller may apply a position compensation value generated last time, and the compensation value generation unit may perform learning to calculate a learned compensation value for reducing the positional error estimated by the positional error estimation unit further based on a position compensation value currently generated and the position compensation value generated last time, and regard the learned compensation value as the posit iron compensation value.

(3) In the robot system described in (1) or (2), the path acquisition unit may adjust exposure time of the image capture device based on operating time of the predetermined operation.

(4) In the robot system described in any one of (1) to (3), the light source may emit light of a particular wavelength, and the image capture device may include a filter having properties of transmitting light of a wavelength other than the particular wavelength lower than properties of transmitting light of the particular wavelength.

(5) In the robot system described in any one of (1) to (3), the image capture device may include a filter that absorbs light.

(6) In the robot system described in any one of (1) to (3), the image capture device may have reduced sensitivity.

(7) In the robot system described in any one of (1) to (3), the light source may emit light in a particular color, and the image capture device may have sensitivity to light in a color other than the particular color lower than sensitivity to light in the particular color.

The present invention is capable of providing a robot system that generates a position compensation value for compensation for control over the position of a robot mechanism unit using a common image capture device having difficulty in acquiring position data in a cycle comparable to a cycle of controlling the robot mechanism unit.

DETAILED DESCRIPTION OF THE INVENTION

An example of an embodiment of the present invention will be described below by referring to the accompanying drawings. In the drawings, corresponding or similar parts are identified by the same sign.

Figure 1:
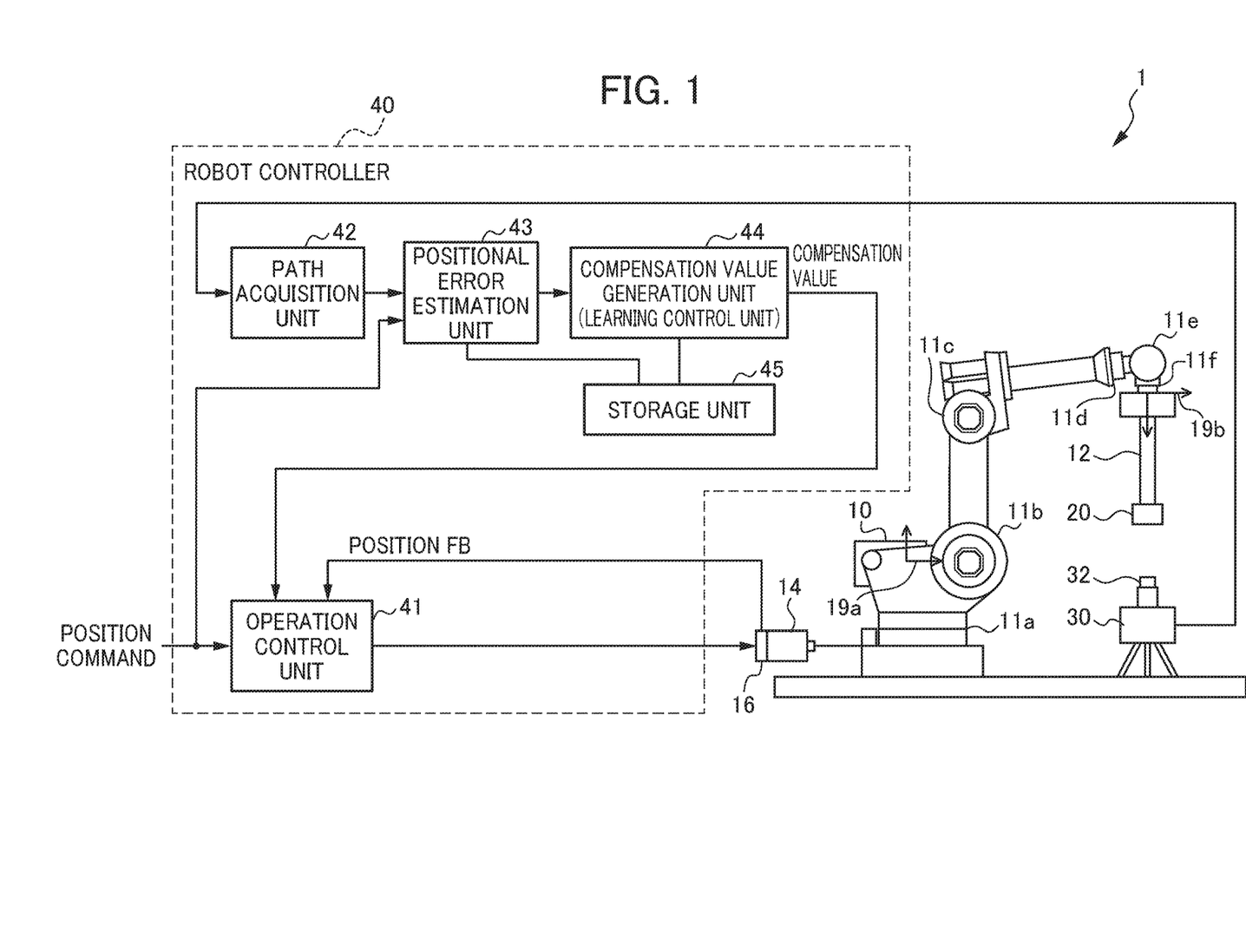
FIG. 1 shows the configuration of a robot system according to an embodiment.

FIG. 1 shows the configuration of a robot system according to this embodiment. A robot system 1 shown in FIG. 1 is a system for laser cutting, sealing, arc welding, etc. using an industrial robot, for example. This embodiment relates to compensation for control over the tip position of an arm of a robot (target site of position control) in the robot system 1. The robot system 1 includes a robot mechanism unit 10, a light source 20, a camera (image capture device) 30, and a robot controller 40.

A publicly-known robot manipulator is usable as the robot mechanism unit 10. FIG. 1 shows a manipulator as an example of the robot mechanism unit 10 including six joint axes 11a to 11f and in which a world coordinate system 19a is defined in space and a mechanical interface coordinate system 19b is defined at a flange position at a tip portion. A tool 12 is provided at the flange position at the tip portion of the robot mechanism unit 10. In the robot mechanism unit 10, a tip portion of the tool 12 is a target site of posit on control.

The robot mechanism unit 10 includes multiple motors (drivers) 14 that drive corresponding ones of the six joint axes 11a to 11f. The robot mechanism unit 10 further includes multiple encoders (position detectors) that detect the rotary positions of corresponding ones of the motors 14. The rotary positions of the motors 14 detected by the encoders 16 are used as position feedbacks. In the below, to facilitate understanding of the features of the present invention, the multiple motors 14 and the multiple encoders 16 will be explained as one motor and one encoder.

The light source 20 is provided at the tip portion of the tool 12 in the robot mechanism unit 10, specifically, at a target site of position control. The light source 20 emits light of a particular wavelength. The light source 20 outputs light continuously under control by the robot controller 40 during operation of the robot mechanism unit 10 based on an operation program (during predetermined operation).

The camera 30 is a vision sensor, for example, and is installed fixedly. The camera 30 includes a band-pass filter 32 arranged in front of a light-receiving part. The band-pass filter 32 has properties of transmitting light of a wavelength other than the particular wavelength lower than properties of transmitting light of the particular wavelength. The camera 30 captures an image of light output from the light source 20 and transmitted through the band-pass filter 32 continuously under control by the robot controller 40 during the operation of the robot mechanism unit 10 based on the operation program (during predetermined operation).

The robot controller 40 controls the position of the robot mechanism unit 10. The robot controller 40 includes an operation control unit 41, a path acquisition unit 42, a positional error estimation unit 43, a compensation value generation unit (learning control unit) 44, and a storage unit 45.

The operation control unit 41 acquires a position command from a numerical controller (not shown in the drawings), for example. The position command is a command for the motor 14 based on the operation program for the robot mechanism unit 10 and about an intended position of the tip portion of the tool 12 in the robot mechanism unit 10 (target site of position control). The operation control unit 41 acquires a position feedback responsive to the position (rotary position) of the motor 14 from the encoder 16. The operation control unit 41 further acquires a position compensation value about the tip portion of the tool 12 in the robot mechanism unit 10 from the compensation value generation unit 44. Based on positional error between the acquired position command and position feedback and the acquired position compensation value, the operation control unit 41 generates a driving current for the motor 14 in the robot mechanism unit 10, and controls the position of the tip portion of the tool 12 in the robot mechanism unit 10.

The path acquisition unit 42 controls operation of the light source 20 and exposure time of the camera 30 during the operation of the robot mechanism unit 10 based on the operation program (during predetermined operation). More specifically, the path acquisition unit 12 sets operating time of the light source 20 and exposure time of the camera 30 in response to operating time of the operation program. After the operation of the robot mechanism unit 10 based on the operation program is finished, the path acquisition unit 42 acquires image data resulting from continuous image capture of light from the light source 20 by the camera 30 during the operation. The path acquisition unit 42 performs image processing on the acquired image data to acquire path data about the light source 20 during the operation of the robot mechanism unit 10 based on the operation program, specifically, path data about the tip portion of the tool 12 in the robot mechanism unit 10 (target site of position control).

The positional error estimation unit 43 acquires a position command in multiple control cycles, and stores the acquired position command once into the storage unit 45 during the operation of the robot mechanism unit 10 based on the operation program. The positional error estimation unit 43 estimates positional error of the path data about the light source 20 from the position command (specifically, an intended position of the tip portion of the tool 12 in the robot mechanism unit 10) in each control cycle based on the path data about the light source 20 acquired by the path acquisition unit 42 and the position command in the multiple control cycles stored once in the storage unit 45. This positional error includes positional shift of the tip portion of the tool 12 in the robot mechanism unit 10 from the intended position and positional shift caused by vibration.

The compensation value generation unit 44 generates a position compensation value based on the positional error estimated by the positional error estimation unit 43, and stores the generated position compensation value into the storage unit 45 in each control cycle. Further, the compensation value generation unit 44 supplies the position compensation value in the storage unit 45 to the operation control unit 41 during subsequent execution of the operation program.

The compensation value generation unit 44 functions as a learning control unit. More specifically, during execution of learning control of repeating the operation of the robot mechanism unit 10 based on the operation program while applying a position compensation value generated last time to the operation control unit 41, the compensation value generation unit 44 performs learning to calculate a learned compensation value for reducing the positional error estimated by the positional error estimation unit 43 further based on a position compensation value currently generated and the positron compensation value generated last time. The compensation value generation unit 44 regards the learned compensation value as a position compensation value, and updates the position compensation value in the storage unit 45.

The storage unit 45 stores multiple position commands once input to the positional error estimation unit 43. The storage unit 45 stores and updates the position compensation value generated by the compensation value generation unit 44. The storage unit 45 is a rewritable memory such as an EEPROM, for example.

The foregoing operation control unit 41, path acquisition unit 42, positional error estimation unit 43, and compensation value generation unit 44 in the robot controller 40 are configured using an arithmetic processor such as a digital signal processor (DSP) or a field-programmable gate array (FPGA), for example. Each function of the robot controller 40 is realized by executing predetermined software (program or application) stored in a storage unit, for example. Each function of the robot controller 40 may be realized using hardware and software in combination or using only hardware (electronic circuit).

Figure 2:
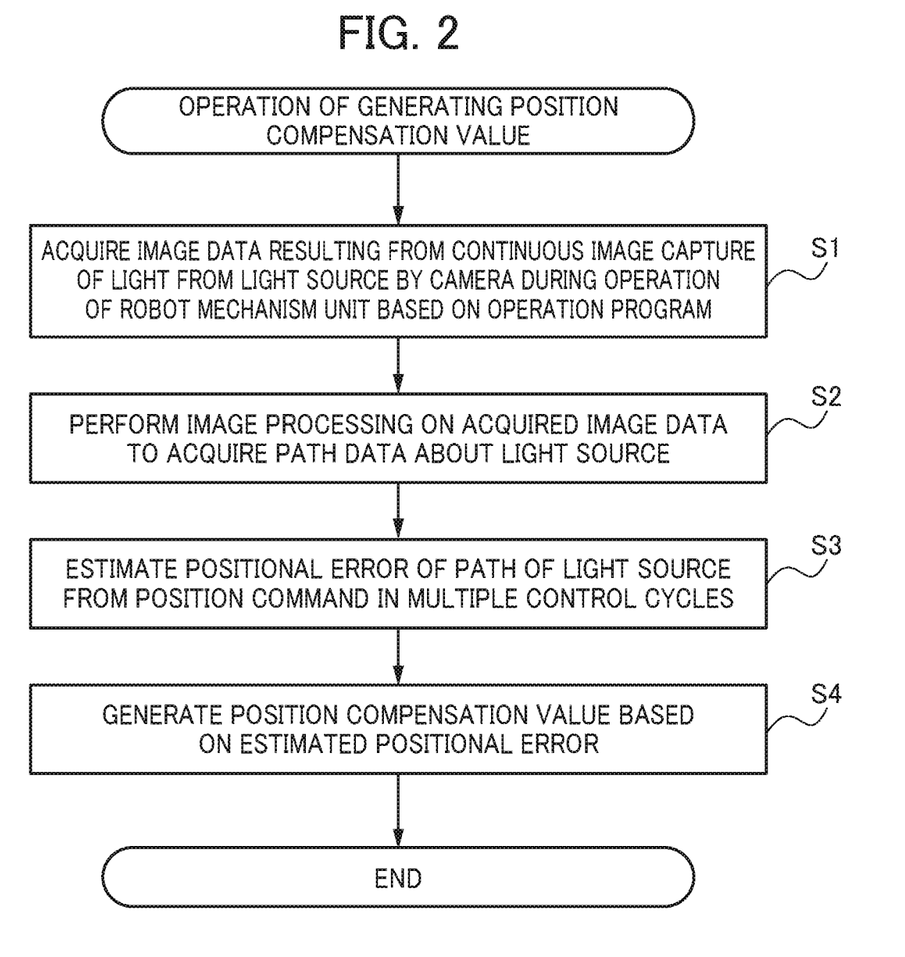
FIG. 2 is a flowchart showing operation of generating a position compensation value by a robot controller in the robot system of this embodiment.

Operation of generating a position compensation value by the robot controller 40 in the robot system 1 of this embodiment will be described next by referring to FIG. 2. FIG. 2 is a flowchart showing the operation of generating a position compensation value by the robot controller 40 in the robot system 1 of this embodiment. This operation of generating a position compensation value may be performed as initial setting at the time of factory shipment by executing an arbitrary operation program, for example. Alternatively, this operation may be performed as initial setting during installation on a field by executing an operation program to be actually used.

(Operation of Generating a Position Compensation Value Performed for the First Time)

First, the operation control unit 41 controls the position of the robot mechanism unit 10 based on a position command for the motor 14 based on an operation program and a position feedback from the encoder 16. During the operation performed for the first time, a position compensation value has not been generated, so that a position compensation value is not supplied from the compensation value generation unit 44 to the operation control unit 41.

At this stage, specifically, during operation of the robot mechanism unit 10 based on the operation program, the path acquisition unit 42 controls operation of the light source 20 and exposure time of the camera 30. After the operation of the robot mechanism unit 10 is finished, the path acquisition unit 42 acquires image data resulting from continuous image capture of light from the light source 20 by the camera 30 during the operation (S1). The acquired image data includes a path of light from the light source 20 during the operation of the robot mechanism unit 10. The path acquisition unit 42 performs image processing on the acquired image data to acquire path data about the light source 20 during the operation of the robot mechanism unit 10 based on the operation program, specifically, path data about the tip portion of the tool 12 in the robot mechanism unit. 10 (target site of position control) (S2).

At this stage, specifically, during the operation of the robot mechanism unit 10 based on the operation program, the positional error estimation unit 43 acquires a position command in multiple control cycles, and stores the acquired position command once into the storage unit 45.

Next, the positional error estimation unit 43 estimates positional error of the path data about the light source 20 from the position command (specifically, an intended position of the tip portion of the tool 12 in the robot mechanism unit 10) in each control cycle based on the path data about the light source 20 acquired by the path acquisition unit 42 and the position command in the multiple control cycles stored once in the storage unit 45 (S3).

Figure 3:
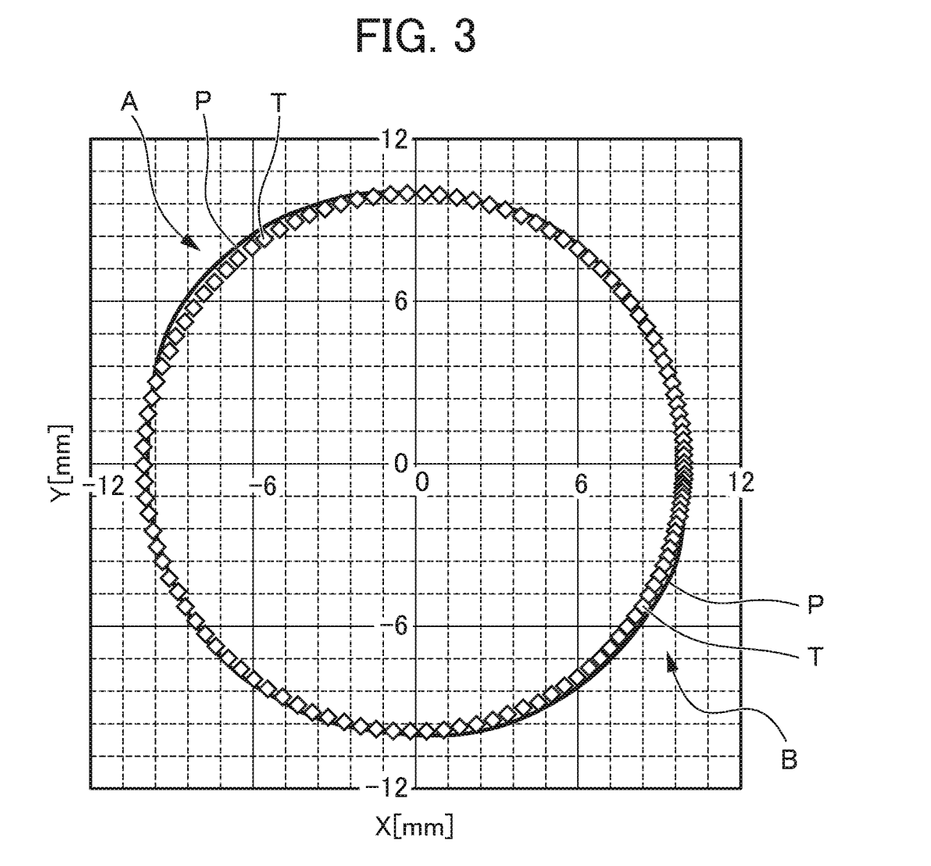
FIG. 3 shows an example of a position command in multiple control cycles based on an operation program and an example of path data about a light source acquired by a path acquisition unit.

FIG. 3 shows an example of a position command T in multiple control cycles based on the operation program and an example of path data P about the light source 20 acquired by the path acquisition unit 42. The position command T and the path data P shown in FIG. 3 are determined in response to execution of an operation program to make a motion in an arc having a radius of 10 mm. This is not the only operation program to be executed in the operation of generating a position compensation value but any operation program can be executed. In FIG. 3, positional error of the path data P about the light source 20 from the position command T is large, particularly in a control cycle section A and a control cycle section B in the path data P about the light source 20.

Figure 4A:
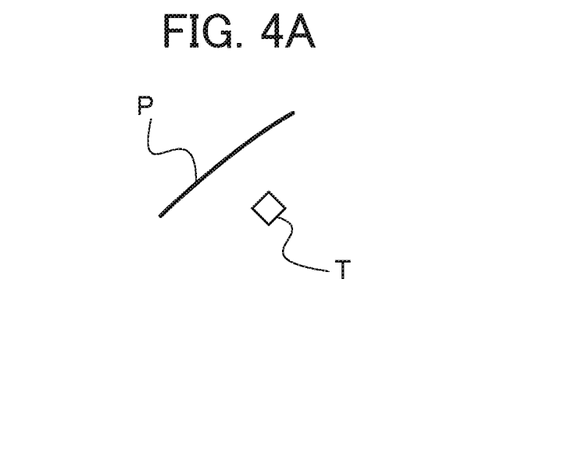
FIG. 4A explains process of converting the path data about the light source shown in FIG. 3 to point sequence data.
Figure 4B:
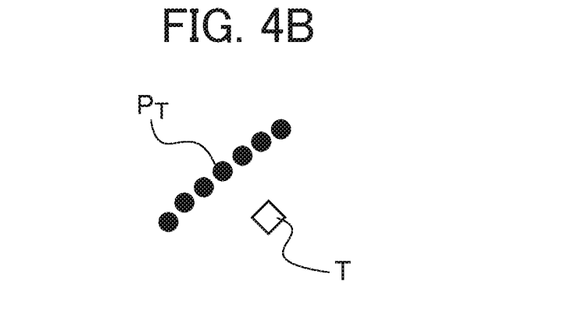
FIG. 4B explains the process of converting the path data about the light source shown in FIG. 3 to the point sequence data.
Figure 4C:
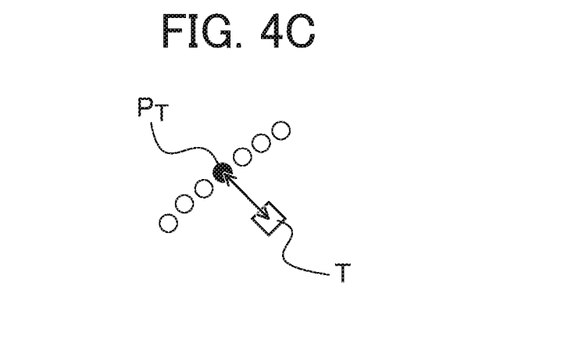
FIG. 4C explains the process of converting the path data about the light source shown in FIG. 3 to the point sequence data.

In this embodiment, the path data P about the light source 20 is linear data. Thus, the path data P and the position command T should be associated for determining positional error. In this regard, the path data P about the light source 20 and the position command T are associated as follows. First, data $P_T$ including a sequence of points at arbitrary intervals shown in FIG. 4B is generated from the linear path data P shown in FIG. 4A by interpolation. Next, as shown in. FIG. 4C, data $P_T$ belonging to the point sequence data $P_T$ after the interpolation is searched for having the shortest distance from each point in the position command T. Next, points belonging to a point sequence $P_T$ after the interpolation and not having been searched for are deleted. In this way, the point sequence data $P_T$ about the path of the light source 20 is acquired as shown in FIG. 5.

Figure 5:
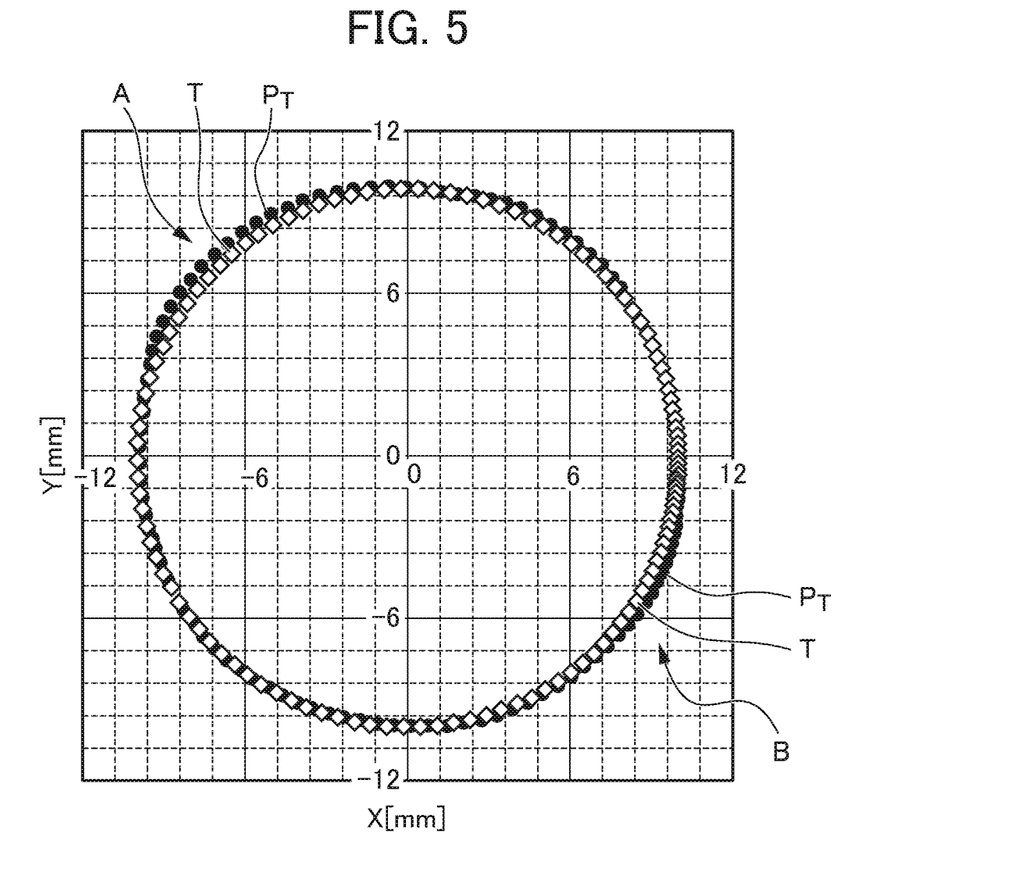
FIG. 5 shows an example of the point sequence data resulting from conversion of the path data about the light source shown in FIG. 3.

As shown in FIG. 5, the positional error estimation unit 43 estimates positional error of the point sequence data $P_T$ about the path of the light source 20 from the position command T in each control cycle.

Next, the compensation value generation unit 44 generates a position compensation value so as to cancel out the positional error estimated by the positional error estimation unit 43, and stores the generated position compensation value into the storage unit 45 in each control cycle (S4).

(Operation of Generating a Position Compensation Value Performed for the Second and Subsequent Times: Learning Control)

In this embodiment, learning control of repeating the operation of the robot mechanism unit 10 based on the operation program is executed while the position compensation value generated last time is applied to the operation control unit 41. In the operation performed for the second and subsequent times, the operation control unit 41 controls the position of the robot mechanism unit 10 based on a position command for the motor 14 based on the operation program, a position feedback from the encoder 16, and the position compensation value generated last time by the compensation value generation unit 44.

For this control, the foregoing processes in steps S1 to S4 shown in FIG. 2 are performed. Specifically, the path acquisition unit 42 and the positional error estimation unit 43 estimate positional error of path data about the light source 20 from the position command in each control cycle. The compensation value generation unit 44 generates a position compensation value in each control cycle so as to cancel out the estimated positional error. The compensation value generation unit 44 generates a new position compensation value (learned compensation value) by making addition or subtraction between a position compensation value currently generated and the position compensation value generated last time, and updates the position compensation value stored in the storage unit 45. In this way, the compensation value generation unit 44 performs learning to calculate the learned compensation value so as to reduce the positional error further.

Figure 6:
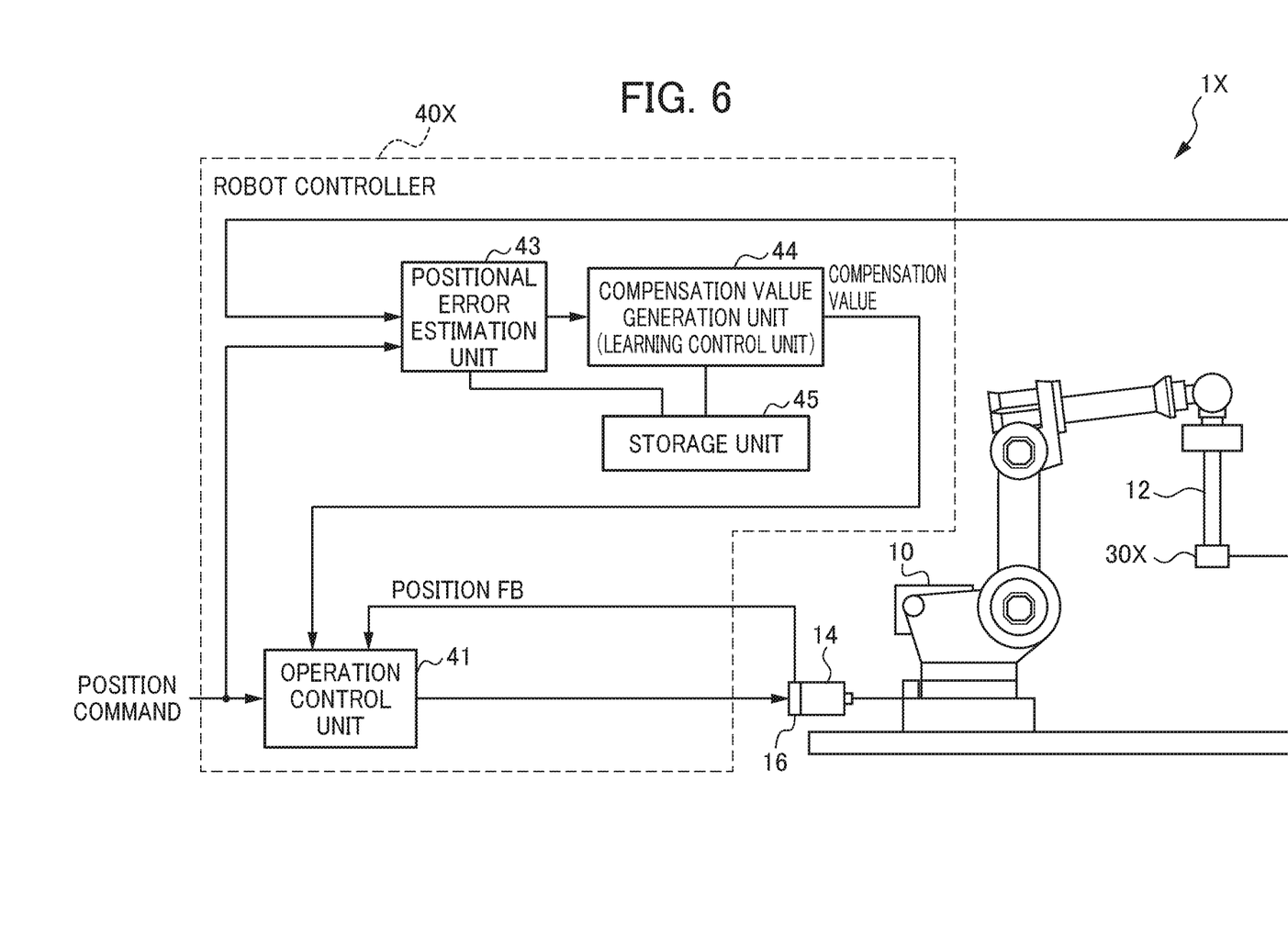
FIG. 6 shows the configuration of a conventional robot system.

FIG. 6 shows the configuration of a conventional robot system (corresponding to the robot systems described in patent documents 1 and 2). A robot system 1X shown in FIG. 6 differs from the robot system 1 of this embodiment shown in FIG. 1 in that the robot system 1X includes a sensor 30X instead of the light source 20 and the camera 30 and includes a robot controller 40X instead of the robot controller 40. The sensor 30X is provided at the tip portion of the tool 12 in the robot mechanism unit 10. The robot controller 40X differs from the robot controller 40 of this embodiment shown in FIG. 1 in that the robot controller 40X does not include the path acquisition unit 42. Thus, during execution of an operation program, the positional error estimation unit 43 acquires a position command, acquires position information about the tip portion of the tool 12 in the robot mechanism unit 10 from the sensor 30X, and estimates positional error of the position of the tip portion of the tool 12 from the position command in each control cycle.

If the sensor 30X is one of an acceleration sensor, a gyroscope sensor, an inertial sensor, and a strain gauge, physical quantities are acquired from these sensors including an acceleration, an angular velocity, force, etc. These quantities should be converted by process such as integration to determine a position. Hence, the accuracy of the position resulting from the conversion may be low. Low accuracy of position calculation reduces effect of improving positional accuracy to be achieved by learning control. In some cases, learning control may cause adverse effect.

By contrast, using an image capture device such as a vision sensor as the sensor 30X allows direct acquisition of position data. Meanwhile, acquiring position data through image processing, etc. takes time. This makes it difficult for a common image capture device to acquire position data in a cycle comparable to a cycle of controlling a robot mechanism unit. Hence, the common image capture device has difficulty in realizing learning control.

In the robot system 1 of this embodiment, the position of the tip of the tool 12 in the robot mechanism unit 10 can be determined with high accuracy using the camera 30 (vision sensor, for example) usable in acquiring position data directly. This makes it possible to increase the accuracy of a position compensation value used for compensating for control over the position of the robot mechanism unit 10, so that control over the position of the robot mechanism unit 10 can be compensated for with higher accuracy. In response to the foregoing problem, in the robot system 1 of this embodiment, the path acquisition unit 42 in the robot controller 40 makes the camera (image capture device) 30 capture an image of light from the light source 20 continuously during execution of an operation program (during predetermined operation) to acquire a path of the light source 20 from the camera (image capture device) 30. The positional error estimation unit 43 estimates positional error of the path of the light source 20 from a position command. This eliminates the need to acquire position data about the light source 20 in a cycle comparable to a control cycle during execution of the operation program (during predetermined operation). Thus, a camera (vision sensor, for example) to take time in acquiring position data through image processing, etc. becomes usable in determining positional error of path data about the light source 20 from a position command, specifically, positional error of the tip portion of the tool 12 in the robot mechanism unit 10 (target site of position control) from the position command.

In the robot system 1 of this embodiment, the compensation value generation unit 44 in the robot controller 40 functions as a learning control unit. More specifically, during execution of learning control of repeating operation of the robot mechanism unit 10 based on an operation program while applying a position compensation value generated last time to the operation control unit 41, the compensation value generation unit 44 performs learning to calculate a learned compensation value for reducing positional error estimated by the positional error estimation unit 43 further based on a position compensation value currently generated and the position compensation value generated last time. This makes it possible to increase the accuracy of a position compensation value used for compensating for control over the position of the robot mechanism unit 10, so that control over the position of the robot mechanism unit 10 can be compensated for with higher accuracy.

In the robot system I of this embodiment, the light source 20 emits light of a particular wavelength. The camera (image capture device) 30 includes the band-pass filter 32 having properties of transmitting light of a wavelength other than the particular wavelength lower than properties of transmitting light of the particular wavelength. This makes it possible to reduce the occurrence of saturation due to disturbance light even if the camera 30 continues capturing an image of light from the light source 20 during operation of the robot mechanism unit 10 based on an operation program (during predetermined operation). For example, even if operating time of the operation program is long, a path image to be acquired is still allowed to fall within the dynamic range of the camera 30.

The present invention is not limited to the embodiment of the present invention described above. The effects described in this embodiment, are merely a list of most preferable effects resulting from the present invention. Effects achieved by the present invention are not limited to those described in this embodiment.

For example, in the foregoing embodiment, the positional error estimation unit 43 in the robot controller 40 estimates positional error of path data about the light source 20 from a position command based on an operation program for the robot mechanism unit 10. Alternatively, the positional error estimation unit 43 may estimate positional error of path data about the light source 20 from a position feedback from the robot mechanism unit 10.

In the foregoing embodiment, the compensation value generation unit 44 in the robot controller 40 functions as a learning control unit. During execution of learning control of repeating operation of the robot mechanism unit 10 based on an operation program while applying a position compensation value generated last time to the operation control unit 41, the compensation value generation unit 44 performs learning to calculate a learned compensation value for reducing positional error further. Alternatively, the compensation value generation unit 44 may be configured to perform only the foregoing first-time operation of generating a position compensation value without performing learning.

In the foregoing embodiment, a light source that emits light of a particular wavelength is described as an example of the light source 20. Alternatively, a light source that emits wideband light may be used. In this case, the band-pass filter 32 of the camera 30 arranged in front of the light-receiving part may be replaced by an ND filter that absorbs wideband light. This configuration also makes it possible to reduce the occurrence of saturation due to disturbance light even if the camera 30 continues capturing an image of light from the light source 20 during operation of the robot mechanism unit 10 based on an operation program (during predetermined operation). Still alternatively, a band-pass filter may be omitted from the camera 30 and low sensitivity (low gain) may be set for the camera 30. This configuration also makes it possible to reduce the occurrence of saturation due to disturbance light even if the camera 30 continues capturing an image of light from the light source 20 during the operation of the robot mechanism unit 10 based on the operation program (during predetermined operation). This configuration further allows reduction in parts count of the robot system.

The light source 20 may emit light in a particular color. In this case, the camera 30 may be a color camera without a band-pass filter and having sensitivity to light in a color other than the particular color lower than sensitivity to light in the particular color. This configuration also makes it possible to reduce the occurrence of saturation due to disturbance light even if the camera 30 continues capturing an image of light from the light source 20 during operation of the robot mechanism unit 10 based on an operation program (during predetermined operation).

In the exemplary configuration of the foregoing embodiment, the light source 20 emits light continuously, and the path acquisition unit 42 in the robot controller 40 acquires the continuous path data P such as that shown in FIG. 3. However, this is not the only case. For example, the light source 20 may emit light discontinuously, and the path acquisition unit 42 may acquire discontinuous path data. In this case, the light source 20 may output light discontinuously in synchronization with a control cycle of an operation program. This allows the path acquisition unit 42 to acquire the point sequence data about a path shown in FIG. 5 directly.

In the exemplary configuration of the foregoing embodiment, the light source 20 is installed at the tip position of the tool 12 in the robot mechanism unit 10 (target site of position control), and the camera (image capture device) 30 is installed fixedly. Alternatively, the camera 30 may be installed at the tip position of the tool 12 in the robot mechanism unit 10, and the light source 20 may be installed fixedly.

In the foregoing embodiment, the industrial robot system is described as an example. However, this does not limit the features of the present invention but the present invention is applicable to compensation for control over the positions of various robot systems.

EXPLANATION OF REFERENCE NUMERALS 1, 1X Robot system
10 Robot mechanism unit
11a, 11b, 11c, 11d, 11e, 11f, Joint axis
12 Tool
14 Motor (driver)
16 Encoder (position detector)
19a World coordinate system
19b Mechanical interface coordinate system
20 Light source
30 Camera (image capture device)
30X Sensor
32 Filter
40, 40X Robot controller
41 Operation control unit
42 Path acquisition unit
43 Positional error estimation unit
44 Compensation value generation unit. (learning control unit)
45 Storage unit

What is claimed is:

1. A robot system comprising:
   a light source;
   an image capture device that captures an image of light from the light source;
   a robot mechanism unit having a target site of position control located at a position where either (i) the light source is disposed or iii) the image capture device is disposed; and
   a robot controller that controls the position of the robot mechanism unit based on a position command for the robot mechanism unit for making the robot mechanism unit perform a predetermined operation, a position feedback from the robot mechanism unit, and a position compensation value for control over the position of the robot mechanism unit,
   wherein the robot controller comprises:
   a path acquisition unit that makes the image capture device capture an image of light from the light source continuously during the predetermined operation to acquire a path of the light source from the image capture device;
   a positional error estimation unit that estimates positional error of the path of the light source from the position command or the position feedback based on the path of the light source acquired by the path acquisition unit and the position command or the position feedback; and
   a compensation value generation unit that generates the position compensation value based on the positional error estimated by the positional error estimation unit.

2. The robot system according to claim 1, wherein during execution of learning control of repeating the predetermined operation,
   the robot controller applies a position compensation value generated last time, and the compensation value generation unit performs learning to calculate a learned compensation value for reducing the positional error estimated by the positional error estimation unit further based on a position compensation value currently generated and the position compensation value generated last time, and regards the learned compensation value as the position compensation value.

3. The robot system according to claim 1, wherein the path acquisition unit adjusts exposure time of the image capture device based on operating time of the predetermined operation.

4. The robot system according to claim 1, wherein the light source emits light of a particular wavelength, and
the image capture device includes a filter having properties of transmitting light of a wavelength other than the particular wavelength lower than properties of transmitting light of the particular wavelength.

5. The robot system according to claim 1, wherein the image capture device includes a filter that absorbs light.

6. The robot system according to claim 1, wherein the image capture device has reduced sensitivity.

7. The robot system according to claim 1, wherein the light source emits light in a particular color, and the image capture device has sensitivity to light in a color other than the particular color lower than sensitivity to light in the particular color.

* * * * *